US005214124A

United States Patent [19]

Drawert et al.

[11] Patent Number: 5,214,124

[45] Date of Patent: May 25, 1993

[54] POLYAMIDE RESIN FROM DISTILLED DIMERIZED FATTY ACID/HYDROGENATED DIMERIZED FATTY ACID

[75] Inventors: Manfred Drawert, Frondenberg; Horst Krase; Horst Wardzichowski, both of Hamm, all of Fed. Rep. of Germany

[73] Assignee: Schering AG, Bergkamen, Fed. Rep. of Germany

[21] Appl. No.: 727,545

[22] Filed: Jul. 9, 1991

[30] Foreign Application Priority Data

Aug. 7, 1990 [DE] Fed. Rep. of Germany ....... 4024981

[51] Int. Cl.[5] .............................................. C08G 69/34

[52] U.S. Cl. .................................... 528/335; 528/336; 528/338; 528/339; 528/339.3; 528/340

[58] Field of Search ..................... 528/339.3, 335, 336, 528/338, 339, 340

[56] References Cited

U.S. PATENT DOCUMENTS

| | | | |
|---|---|---|---|
| 2,482,761 | 9/1949 | Goebel | 260/407 |
| 3,256,304 | 6/1966 | Fischer et al. | 260/407 |
| 3,408,317 | 10/1968 | Vertnik | 528/339.3 |
| 3,622,604 | 11/1971 | Drawert et al. | 528/339.3 |
| 4,668,765 | 5/1987 | Drawert et al. | 528/339.3 |
| 4,760,125 | 7/1988 | Wiemers et al. | 528/339.3 |

*Primary Examiner*—Harold D. Anderson
*Attorney, Agent, or Firm*—Curtis, Morris & Safford

[57] ABSTRACT

The present invention relates to thermoplastic polyamide resins for use in relief printing which are prepared by condensation of distilled and/or hydrogenated dimeric fatty acids, a mixture of oleic acid and isostearic acid, a substantially equivalent amount of ethylenediamine, and optionally co-diamines.

8 Claims, No Drawings

POLYAMIDE RESIN FROM DISTILLED DIMERIZED FATTY ACID/HYDROGENATED DIMERIZED FATTY ACID

The decoration of organic and inorganic substrates in relief has long been known.

The original technique of applying relieflike imprints to paper or cardboard for book covers, promotional articles, postcards, calling cards, wrappers, etc., consists of producing the raised or depressed impression with engraved plates or then with type on printing presses with or without ink transfer. The printing is done in one or several colors in one or more operations and then raised in relief.

In recent years, a modification of this process has been gaining ground. Here the substrates are still provided with an impression, but embossing is dispensed with. The relief is produced by coating the impression with a thermoplastic resin.

In actual practice, the substrate is printed by the offset process with inks commonly used for this purpose. This is immediately followed by sprinkling a finely pulverized thermoplastic resin onto the still wet and tacky surface of the impression. The excess is drawn off by suction from the portions which have not been printed and therefore are not tacky. During the heat treatment which follows, the resin is heated to temperatures above its melting point.

The thermoplastic resins used must meet a number of requirements. The most important of these are that the resin should have no intrinsic color, or then as little as possible, and that it should be capable of being ground into a fine powder which does not block under conditions of use and thus remains free-flowing, and which under the action of heat flow out into a smooth surface free of pinholes.

Adequate adhesion to the various substrates, and particularly to paper, cardboard, metal and glass, good flexibility, compatibility with the background ink, and nontacky surfaces are also required.

While the polyamide resins based on dimerized fatty acids and ethylenediamine used up to now for this purpose meet a number of these requirements, there is still room for improvement. One important drawback is that with these resins, constituents of the mixture have a tendency to migrate to the surface, which is known as blooming. This not only imparts a greasy appearance of the surface but also causes a significant and undesirable loss of gloss.

The present invention seeks to overcome these drawbacks of the prior art and to provide polyamides based on dimerized fatty acids for use in relief printing which are distinguished not only by good adhesion, flexibility and water, oil, acid and alkali resistance but also by improved surface properties, a good color index and improved resistance to discoloration under conditions of condensation and of use, and which in addition produce no blooming effects.

Thus, the present invention relates to a relief print thermoplastic polyamide prepared by condensation reaction of (A) at least one distilled dimerized fatty acid,
(B) at least one hydrogenated dimerized fatty acid, or both, optionally with
(C) at least one co-dicarboxylic acid; and
(D) oleic acid;
(E) isostearic acid; and
(F) ethyleneidamine; optionally with
(G) 1,6-diaminohexane, 1,2-diaminopropane, 1,12-diamino-4,9-dioxadodecane or poly(oxypropylene)diamine; optionally with
(H) at least one conventional agent selected from the group consisting of flow-control agents, optical brighteners, and stabilizers, wherein up to 2 weight percent, based on the fatty acids (A), (B), (D) and (E), of component (C) are used, the ratio of component (A), (B) or both to components (D) and (E) ranges from 0.5:0.5 to 0.75:0.25 equivalents, based on the carboxyl groups, the ratio, within said ratio, of component (D) to component (E) ranges from 0.9:1.1 to 1.1:0.9, the ratio of component (F) to component (G) ranges from 1:0 to 0.8:0.2; and the acid components (A) to (E) and the amino components (F) and (G) are used in substantially equivalent amounts.

For the purposes of this invention, dimerized fatty acids are commercial polymerized fatty acids which have iodine numbers ranging from about 90 to 130 and whose dimeric fatty-acid content has been increased by commonly used processes to about 85–100 percent. The iodine number can be reduced by generally known hydrogenation processes to values as low as about 10.

The iodine number is determined by methods commonly employed in practice and is expressed in grams of iodine per 100 grams of substance.

The polymerized fatty acids can be prepared by the usual processes (see U.S. Pat. Nos. 2,482,761 and 3,256,304, for example) from unsaturated natural and synthetic monobasic aliphatic acids having from 12 to 22, and preferably 18, carbon atoms.

Typical commercial polymeric fatty acids have approximately the following composition prior to distillation:

| | |
|---|---|
| Monomeric acids | 5 to 15 wt. % |
| Dimeric acids | 60 to 80 wt. % |
| Tri- and higher-polymeric acids | 10 to 35 wt. % |

After distillation, the dimeric-acid fraction should be practically free of monocarboxylic acids, and the proportion of the trimerized and higher-polymerized fatty acids should not be more than 2 weight percent.

The composition of the fatty acids is determined by the usual gas-liquid chromatography (GLC) techniques, with the specification of the dimer content including, in addition to the dimerized fatty acids, the minor proportions of the fully or partly decarboxylized dimerization products which are necessarily formed in the dimerization process.

The dimeric fatty acids preferably used in accordance with the invention have iodine numbers ranging from 10 to 40 in the case of hydrogenated acids, and from 90 to 130 in the case of nonhydrogenated acids, and contain from 70 to 100 percent by weight of dimeric acids.

The oleic acid and isostearic acid according to (D) and (E), respectively, used in the preparation of the polyamide resins used in accordance with the invention are commercial technical grades.

The ratio of the distilled fatty acids (A) and (B) containing from 85 to 100, and preferably from 90 to 99, percent by weight of dimeric fatty acid, and not more than 2 percent by weight of tri- and higher-polymerized fatty acid, to the oleic acid and isostearic acid mixtures (D) and (E) should range from 0.5:0.5 to 0.75:0.25.

The co-dicarboxylic acids which in accordance with the invention may also be used in the preparation of the resins are aliphatic unbranched dicarboxylic acids such as, in particular, azelaic acid and sebacic acid. These acids may be used in amounts of up to 2 percent by weight, based on the total amount of the dimerized fatty acids specified under (A) and (B). In addition to the two co-dicarboxylic acids named, dicarboxylic acids of lesser or greater chain length may be used, but since they usually have an adverse effect on the surface properties, their use is not preferred.

The ether diamines also used in the preparation of the resins used in accordance with the invention are the commercial compounds, produced by cyanoethylation of alpha-omega-diols followed by hydrogenation, with molecular weights of about 200 to 2,000, such as 1,12-diamino-4,9-dioxadodecane in particular. Suitable for use are, moreover, poly(oxyalkylene)polyamines obtained by known processes through catalytic aminolysis of poly(oxyalkylene)diols. Commercial compounds with molecular weights ranging from 400 to 2,000 are preferably used. In accordance with the invention, the ether diamines are added in amounts of from 0.05 to 0.1 equivalent, based on the total amine, compounds with low molecular weights being at the upper limit.

The ratio of ethylenediamine to the diamines also used should be in the range from 1.0:0 to 0.8:0.2.

The ratio of the acid components to the amino equivalents is approximately equivalent. The sum of the amine and acid values of the polyamides preferably is less than 10.

The polyamide resins used in accordance with the invention can be ground even at normal temperature into a powder that will not block, without additional additives, even under conditions of use and will remain perfectly free-flowing. This is why precisely and sharply defined zones are achievable even in the case of very small imprints, or imprints with a lot of detail. The particle size of the powder can be varied as required and will range from 50 to 250, and preferably from 80 to 160, microns.

The melting point of the resins is adapted to the practical requirements. It is sufficiently low to prevent impairment of the substrates or of the background ink by the melting temperatures, yet high enough so that no blocking occurs even at application temperatures.

The melting range, as measured by the ring and ball method, is from 95° to 125° C., and preferably from 110° to 120° C.

The resins thus have a narrow melting range, which makes it possible to achieve freedom from tackiness and blocking rapidly during the cooling stage which follows the melting stage. This is a important factor in attaining short cycle times.

Moreover, the polyamides of the invention are readily compatible with the commonly used background inks so that with melting temperatures which may be as much as 100° C. above the melting point of the polyamide good leveling of the melt, and hence a satisfactory surface after solidification, is assured.

The melt viscosities, measured consistently at 160° C. with a rotary cone-plate viscometer manufactured by Haake, as directed by the manufacturer, range from about 0.1 to 0.5 Pa.s, and are preferably in the range from 0.2 to 0.3 Pa.s.

Because of its good adhesion, particularly to paper and paperboard, and its flexibility, the coating withstands all of the usual stresses, such as being wound into rolls or flexed, without the relief flaking or cracking.

The improved leveling properties of the molten resins result in a smooth, glossy surface free of pitting and renders the polyamides used in accordance with the invention particularly well suited for use in relief printing.

To improve the leveling properties of the molten resins still further, especially those of resins having a viscosity greater than 0.3 Pa.s, commonly employed silicone- or acrylate-based flow-control agents may be used in amounts ranging from about 0.1 to 1.0, and preferably from 0.2 to 0.3 weight percent, based on the total amount of the fatty acids.

Antioxidants and optical brighteners may also be employed, in the amounts commonly used.

The resins used in accordance with the invention may be prepared by known processes through melt condensation at temperatures ranging from 180° to 230° C., and preferably from 200° to 210° C., optionally by the use of commonly employed catalysts, such as phosphoric acid, phosphorous acid and hypophosphoric acid, in amounts of up to 0.5 weight percent, based on the fatty acids.

PREPARATION OF POLYAMIDE RESINS

Example 1

In a 1-liter three-neck flask equipped with a stirrer, thermometer and downward condenser, 150 g (0.375 equivalent) of dimerized, distilled and hydrogenated fatty acid (B), 150 g (0.375 equivalent) of dimerized, distilled fatty acid (A), 50 g (0.125 equivalent) of isostearic acid (E), 50 g (0.125 equivalent) of oleic acid (D), 42.3 g (1.0 equivalent) of ethylenediamine (F), and 1 g of 50% hypophosphoric acid (0.25 wt. %, based on [A], [B], [D] and [E]) as catalyst were mixed and heated over a period of 2 hours to 200° C.

That temperature was maintained for 4 hours, a vacuum of 10–12 mbar being applied during the last 2 hours. This was followed by flushing with nitrogen, and 1 g of a flow-control agent (H) based on a silicone oil (Baysilon ® Oil of Bayer) (0.25 wt. %, based on [A], [B], [D] and [E]) is added, stirring being continued for 0.5 hour.

The thermoplastic polyamide obtained was found to have a ring-and-ball softening point (DIN 52011) of 113° C., a viscosity of 0.28 Pa.s at 160° C. (measured with the PK 401 W rotational viscometer, manufactured by Haake, Karlsruhe, as directed by the manufacturer), an acid value of 4.3, and an amine value of 1.2.

The examples given in Table 1 which follows were prepared analogously.

TABLE 1

| Example | Dimerized fatty acid (A) + (B) Equiv. | Oleic acid (D) Equiv. | Iso-stearic acid (E) Equiv. | Co-dicarboxylic acid (C) wt. % (based on (A), (B) (D), (E) | Ethylene-diamine (F) Equiv. | Co-diamine Equiv. | Amine value | Acid value | Ring & ball soften-ing °C. | Melt viscosity at 160° C. Pa · s |
|---|---|---|---|---|---|---|---|---|---|---|
| 1 | 0.375 (B) 0.375 | 0.125 | 0.125 | — | 1.0 | — | 1.2 | 4.3 | 113 | 0.28 |
| 2 | 0.5 (A) | 0.250 | 0.250 | Azelaic: 1.25 | 0.8 | 1,2-di-pr 0.2 | 1.1 | 6.0 | 111 | 0.15 |
| 3 | 0.25 (B) 0.25 (A) | 0.250 | 0.250 | — | 0.8 | 1,2-di-pr 0.2 | 1.0 | 5.8 | 119 | 0.10 |
| 4 | 0.75 (B) | 0.125 | 0.125 | — | 1.0 | — | 1.1 | 6.1 | 113 | 0.24 |
| 5 | 0.375 (B) 0.375 (A) | 0.125 | 0.125 | — | 0.95 | HDA: 0.05 | 2.9 | 6.5 | 108 | 0.31 |
| 6 | 0.375 (B) 0.375 (A) | 0.125 | 0.125 | Sebacic: 1.0 | 0.9 | POPD: 0.1 | 2.2 | 4.8 | 116 | 0.4 |
| 7 | 0.375 (B) 0.375 (A) | 0.125 | 0,125 | — | 0.95 | BDA: 0.05 | 2.6 | 6.0 | 115 | 0.29 |

EXPLANATORY NOTES

The dimerized fatty acids used in the examples have the following composition:

(A):

Monomeric fatty acid: 0.1 wt. %
Dimeric fatty acid: 98.2 wt. %
Trimeric fatty acid: 1.7 wt. %
Iodine number: 110

(B):

Monomeric fatty acid: 0.9 wt. %
Dimeric fatty acid: 99.1 wt. %
Iodine number: 10

(C):

Azelaic acid
Sebacic acid (D): Oleic acid (Priolene® 6907, manufactured by Unichema)

(E): Isostearic acid (Prisorine® 3501, manufactured by Unichema)

1,2-di-pr = 1,2-Diaminopropane
HDA = Hexamethylenediamine
BDA = Butanediol ether diamine
POPD = Poly(oxypropylene)diamine, molecular weight about 400
H = Flow-control agent

INSPECTION OF POLYAMIDE RESINS

The inventive polyamide resin of Example 1 was ground in a laboratory mill and a size fraction of 160 to 80 microns was screened out with a set of screens. A blue-pigmented high-viscosity offset ink (Type N 466009, manufactured by Hostmann Steinberg) was then applied by means of a small hand-operated letterpress to the coated (smooth) side of a light white cardboard (calling-card stock) in a thickness of 12 microns, and after airing for 8–10 seconds the screened powder was sprinkled onto it. Because of the tacky character of the ink, an amount of powder sufficient for relief formation adhered while the surplus material could readily be removed. The cardboard so prepared was then placed in a convexograph (manufactured by Grafra) and heated with infrared lamps from above, at a distance of about 30 cm. After a retention time of 3–5 seconds, the powder melted and flowed out to form a smooth, continuous, glossy film which on removal from the heating zone solidified immediately. Since the polyamide resin has virtually no intrinsic color, no change in the blue hue of the printing ink could be observed. Moreover, the polyamide film had sharp boundaries which corresponded precisely to the imprint.

During the inspection with a magnifying glass carried out for evaluation of the surface, none of the defects usually encountered, such as irregular leveling or blooming, was noticed.

Substrate: Cardboard. Melting passes: 2. Heat output: 1950 watts.

TABLE 2

| No. | Thermography Resin Example | Thermography Resin Table | Gloss (60°)* 1 day | Gloss (60°)* 1 week | Gloss (60°)* 4 weeks | Leveling See legend | Surface** 1 day | Surface** 4 weeks |
|---|---|---|---|---|---|---|---|---|
| 1 | 1 | 1 | 81 | 79 | 78 | 3 | 0 | 0 |
| 2 | 2 | 1 | 87 | 86 | 86 | 2–3 | 0 | 0 |
| 3 | 3 | 1 | 87 | 86 | 86 | 2–3 | 0 | 0 |
| 4 | 4 | 1 | 80 | 81 | 81 | 2–3 | 0 | 0 |
| 5 | 5 | 1 | 83 | 83 | 80 | 2–3 | 0 | 0 |
| 6 | 6 | 1 | 80 | 80 | 79 | 2 | 0 | 0 |
| 7 | 7 | 1 | 82 | 81 | 80 | 2–3 | 0 | 0 |

Leveling:
1 = Surface perfectly smooth
2 = Very fine orange-peel structure
3 = Pronounced orange-peel structure
4 = Orange-peel structure, isolated pinholes
5 = Orange-peel structure, some pinholes
6 = Orange-peel structure, numerous pinholes
7 = Orange-peel structure, covered with pinholes
*Measured with reflectometer manufactured by the Dr. Lange company. UME universal measuring unit. Reflectometer gloss value measuring head 60°.
**0 = Satisfactory; no smeared film.

We claim:

1. A relief print thermoplastic polyamide prepared by condensation reaction of (A) at least one distilled dimerized fatty acid,
(B) at least one hydrogenated dimerized fatty acid, or both, optionally with
(C) at least one co-dicarboxylic acid; and
(D) oleic acid;
(E) isostearic acid; and
(F) ethylenediamine; optionally with
(G) 1,6-diaminohexane, 1,2-diaminopropane, 1,12-diamino-4,9-dioxadodecane or poly(oxypropylene)diamine; optionally with
(H) at least one conventional agent selected from the group consisting of flow-control agents, optical brighteners, and stabilizers, comprising up to 2 weight percent, based on the fatty acids (A), (B), (D) and (E), of component (C), the ratio of component (A), (B) or both to components (D) and (E) ranging from 0.5:0.5 to 0.75:0.25 equivalents, based on the carboxyl groups, the ratio, within said ratio, of component (D) to component (E) ranging from 0.9:1.1 to 1.1:0.9, the ratio of component (F) to component (G) ranging form 1:0 to 0.8:0.2; and the acid components (A) to (E) and the amino components (F) and (G) in substantially equivalent amounts.

2. A thermoplastic polyamide as defined in claim 1, wherein (A) comprises more than 90 percent by weight of dimerized acids, and (B) comprises hydrogenated fatty acids with an iodine number of from 10 to 30, alone or in a mixture.

3. A thermoplastic polyamide as defined in claim 1, prepared by polycondensation reaction of (C) in an amount of no more than 2 weight percent, based on the dimerized fatty acids, wherein at least one of the co-dicarboxylic acids is selected from the group consisting of sebacic acid, azelaic acid and isophthalic acid.

4. A thermoplastic polyamide as defined in claim 1, wherein (G) is condensed in amounts of from 0.05 to 0.1 equivalent, based on total amine equivalents.

5. A thermoplastic polyamide as defined in claim 1, produced by polycondensation reaction of 0.5 equivalent of the components (A) and (B) in a mixing ratio of 1:1, from 0.1 to 0.5 weight percent, based on (A) and (B), of azelaic acid, 0.5 equivalent of the components (D) and (E), from 0.9 to 1.0 equivalent of ethylenediamine (F), and up to 0.1 equivalent of 1,2-diaminopropane or poly(oxypropylene)diamine with a molecular weight of about 400.

6. A thermoplastic polyamide as defined in claim 1, produced by polycondensation reaction of 0.75 equivalent of the components (A) and (B) in a mixing ratio of 1:1, from 0.1 to 0.5 weight percent, based on (A) and (B), of azelaic acid, 0.5 equivalent of the components (D) and (E), from 0.9 to 1.0 equivalent of ethylenediamine (F), and up to 0.1 equivalent of 1,2-diaminopropane or poly(oxypropylene)diamine with a molecular weight of about 400.

7. A thermoplastic polyamide as defined in claim 1, wherein said polyamide has a softening point of from 95° to 125° C. and a viscosity, measured at 160° C., of from 0.1 to 0.5 pascal-seconds.

8. A thermoplastic polyamide as defined in claim 1, comprising from 0.1 to 0.3 weight percent, based on the acid components (A) to (E), of at least one flow-control agent.

* * * * *